Patented Jan. 23, 1934

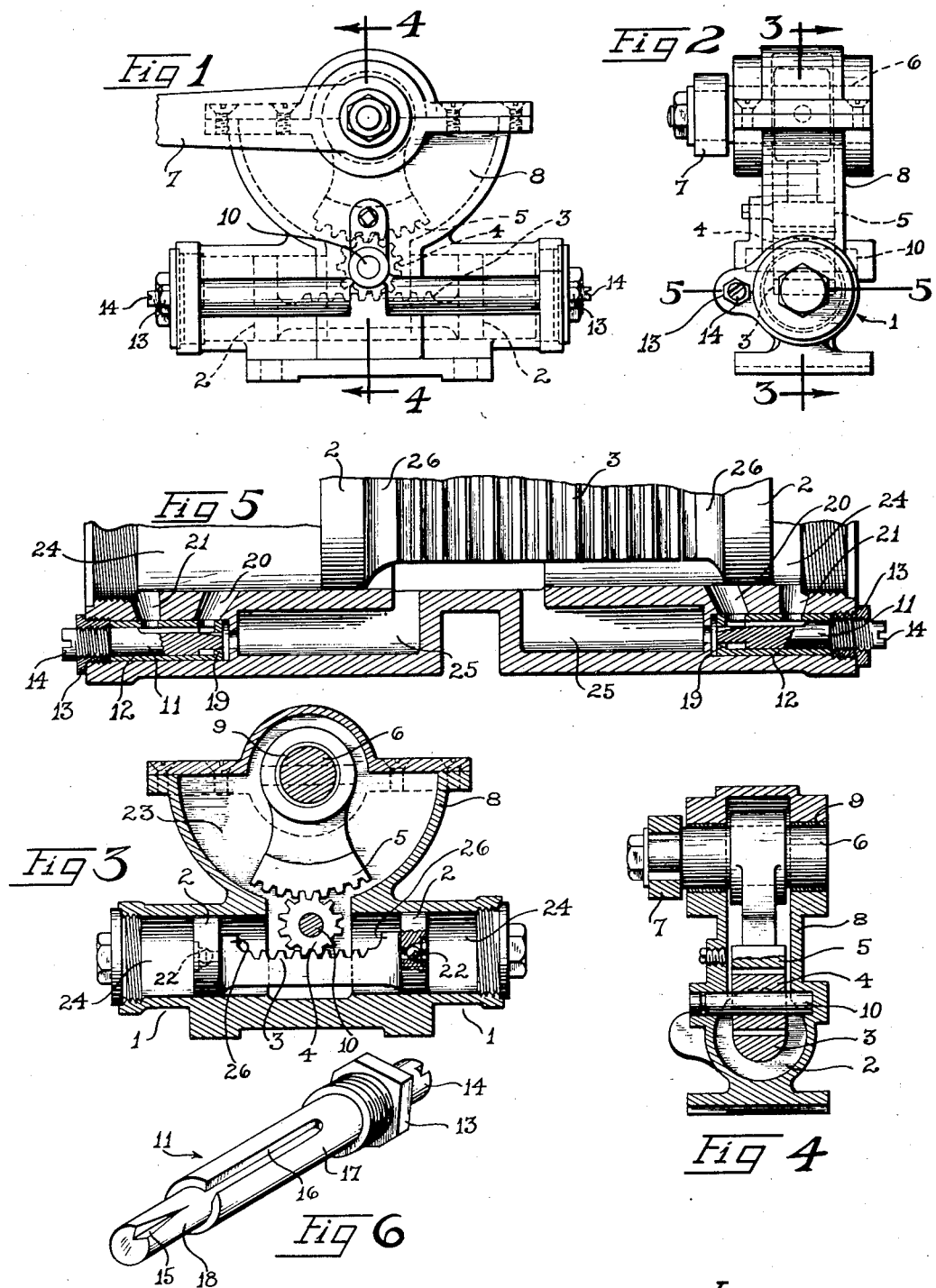

1,944,689

UNITED STATES PATENT OFFICE 1,944,689

MOVEMENT CONTROLLING DEVICE

Earl L. Heverly, Chicago, Ill., assignor to Norton Door Closer Co., Division of Yale & Towne Mfg. Co., New York, N. Y., a corporation of Connecticut Application May 9, 1932. Serial No. 610,093

8 Claims. (Cl. 188—97)

My invention relates to movement-controlling devices.

One of the objects of my invention is to provide a shock-absorbing device of the type having a horizontally disposed rock shaft in which means are provided for preventing the oil or liquid from leaking out around the rock shaft.

Another object is to provide such a construction in which the main rock shaft is above the oil level in the reservoir.

A further object is to provide an improved double-acting check of the type indicated above.

A still further object is to provide an improved construction along the lines indicated above comprising an operating segmental gear substantially outside the cylinder.

Another object is to provide a construction as indicated above involving the use of an idler between the rack and the segmental gear.

Further objects will appear from the description and claims.

In the drawing in which my invention is illustrated:

Figure 1 is a side elevation of a movement-controlling device;

Fig. 2 is an end view of the structure of Figure 1;

Fig. 3 is a section on the line 3—3 of Fig. 2;

Fig. 4 is a section on the line 4—4 of Fig. 1;

Fig. 5 is a section on the line 5—5 of Fig. 2; and

Fig. 6 is a perspective view of a movement-controlling valve.

In general, the construction shown comprises a duplex aligned cylinder construction 1, a duplex piston 2 operating therein, a rack 3 connecting the pistons, an idler pinion 4 meshing with the rack 3, a segmental gear 5 meshing with the idler pinion 4, a rock shaft 6 on which the segmental gear 5 is mounted, and a rock arm 7 secured to the rock shaft.

The rock shaft 6 is mounted with its axis horizontal, and the segmental gear 5 secured to this rock shaft operates in a semi-circular housing 8 extending upwardly from the duplex cylinder 1. This construction brings the rock shaft 6 far above the oil level in the device so that there is no danger of oil leaking out between the bearings 9 and the rock shaft 6. The idler 4 is rotatable on the stud 10 on which it is mounted so that there is no danger of leaking at the point where this stud 10 is driven into the casting, as this can easily be made a liquid-tight fit, since there is no relative movement between the stud and the bore in the casting.

As shown in Figs. 3 and 4, the opening between the semi-circular housing 8 and the cylinder 1 is large enough to permit the insertion of a pinion into position through this opening.

The valve construction for controlling the movement of the piston may be the same for both ends. Each of these valve constructions comprises a duplex valve 11, a sleeve 12 in which the valve operates fitting snugly in a bore in the cylinder casting, and a nut 13 threaded into the end of the cylinder casting holding the sleeve 12 in place and having a screw-threaded connection with the threaded end of the duplex valve 11.

The duplex valve itself is provided with a screw head 14 for engagement with a screw driver or other suitable adjusting tool. This duplex valve has a tapering notch 15 at its end and a comparatively narrow groove 16 in the enlarged intermediate portion 17. The reduced portion 18 with the tapering notch 15 is designed to enter and fit snugly in the opening in the end of the bushing 19 so that as the valve is screwed in or out the effective area of the tapering notch 15 is diminished or increased respectively.

A pair of passages 20 and 21 connect the valve bore with the cylinder bore. The tapering notch 15 controls the flow in the passage 20 and the narrow groove 16 controls the flow through the passage 21. Each of the pistons 2 is provided with a check valve 22 permitting free flow from the central oil reservoir 23 through the piston 2 into the cylinder proper 24 but preventing flow from the cylinder proper past the valve 22 back into the central reservoir 23. With this construction, movement of the pistons to the left will, therefore, be controlled by the left hand duplex valve and movement of the piston to the right will be controlled by the right hand duplex valve. The L-shaped passage 25 leads from the valve bore to the intermediate oil reservoir.

With this construction, if the piston is being forced to the left, as viewed in Fig. 5, the movement up to the point when the left hand end of the piston closes the right hand passage 20 will be controlled by the amount of restriction of the tapering notch 15. After this right hand passage 20 is cut off, all the flow will have to be through the left hand passage 21 and the flow will then be controlled by the restriction occasioned by the position of the narrow groove 16.

The construction of the duplex valve 11 is such that the flow through the passage 20 may first be controlled to give any desired restriction and thereafter the flow through the passage 21 may be controlled to give any desired restriction without materially changing the restriction with respect to the passage 20.

In explanation of this, it is pointed out that the internal thread of the bushing 13 is of such slight pitch that a half revolution of the valve 11 will not cause much longitudinal travel of the valve and will therefore not greatly change the restriction effected by the tapering notch 15. Because of this construction, it will be seen that the valve 11 may be first adjusted by screwing it in or out to permit the desired freedom of flow through the passage 21 and thereafter the flow through the groove 16 may be given the desired restriction by a partial revolution only of the duplex valve. It will thus be seen that the duplex valve provides for practically independent adjustment of flow through the passages 20 and 21. This enables the final movement of the piston to be controlled independently of the initial movement which is desirable in many situations.

In order to limit the travel of the duplex piston in a satisfactory manner, means are provided whereby the pinion 4 serves as a stop. For this purpose the duplex piston is provided with a pair of shoulders 26 which come in contact with the teeth of the pinion 4 at the extreme limits of movement of the piston.

It will be seen that the construction described is useful where a horizontally-disposed rock shaft and cylinder are desirable and that the construction is such that oil or other liquid will not leak out because of the fact that the rock shaft is a substantial distance above the oil level in the reservoir.

This application is a continuation in part of my copending application Serial No. 296,534, filed July 31, 1928.

Further modifications will be apparent to those skilled in the art and it is desired, therefore, that the invention be limited only by the prior art and the scope of the appended claims.

Having thus described my invention, what I claim and desire to secure by Letters Patent is:

1. A fluid pressure shock absorber comprising a cylinder, a fluid controlled piston operating therein, a rack movable with said piston and lying within said cylinder, a pinion meshing with said rack and a gear meshing with said pinion and lying substantially outside said cylinder, whereby said gear does not interfere with the movement of said piston.

2. A fluid pressure shock absorber comprising a cylinder, a fluid controlled piston operating therein, a rack movable with said piston and lying within said cylinder, a pinion meshing with said rack, a gear meshing with said pinion and lying substantially outside said cylinder, whereby said gear does not interfere with the movement of said piston, and a housing for said gear.

3. A fluid pressure shock absorber comprising a cylinder, a fluid controlled piston operating therein, a rack movable with said piston and lying within said cylinder, a pinion meshing with said rack, a gear meshing with said pinion and lying substantially outside said cylinder, whereby said gear does not interfere with the movement of said piston, and a housing for said gear, an opening being provided between said housing and cylinder large enough to permit said pinion to be inserted therethrough in assembly.

4. A fluid pressure shock absorber comprising a cylinder, a fluid controlled piston operating therein, a rack movable with said piston and lying within said cylinder, a pinion meshing with said rack, a gear meshing with said pinion and lying substantially outside said cylinder, whereby said gear does not interfere with the movement of said piston, a housing for said gear, and a rock shaft on which said gear is mounted, said housing having a bearing member in which said shaft is mounted.

5. A fluid pressure shock absorber comprising a cylinder, a fluid controlled piston operating therein, a rack movable with said piston and lying within said cylinder, a pinion meshing with said rack, a gear meshing with said pinion and lying substantially outside said cylinder, whereby said gear does not interfere with the movement of said piston, a housing for said gear, a rock shaft on which said gear is mounted, said housing having a bearing member in which said shaft is mounted, and a cover for said housing having a bearing member cooperating with the bearing member on the housing.

6. A fluid pressure shock absorber comprising a cylinder, a fluid controlled piston operating therein, a rack movable with said piston and lying within said cylinder, a pinion meshing with said rack, and a gear meshing with said pinion and lying substantially outside said cylinder, whereby said gear does not interfere with the movement of said piston, said pinion serving as a stop to limit the movement of the piston.

7. A fluid pressure motion-controlling device comprising a cylinder, a fluid control piston operating therein, a rack movable with said piston and lying within said cylinder, a pinion meshing with said rack, a gear meshing with said pinion, housing means for said gear, and a rock shaft on which said gear is mounted extending through the side of said housing.

8. A fluid pressure motion-controlling device comprising a cylinder, a fluid control piston operating therein, a rack movable with said piston and lying within said cylinder, a pinion meshing with said rack, a non-rotatable pin on which said pinion is rotatably mounted, and a gear meshing with said pinion.

EARL L. HEVERLY.